June 5, 1945.  G. R. ECKSTEIN  2,377,679
GAUGE
Filed Sept. 14, 1943  2 Sheets-Sheet 1
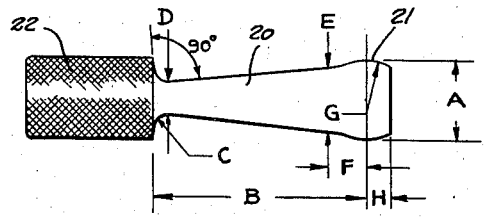
INVENTOR.
GEORGE R. ECKSTEIN
ATTORNEYS June 5, 1945.  G. R. ECKSTEIN  2,377,679
GAUGE
Filed Sept. 14, 1943  2 Sheets-Sheet 2
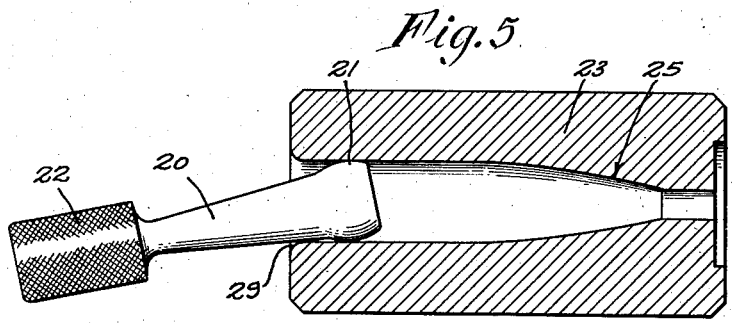
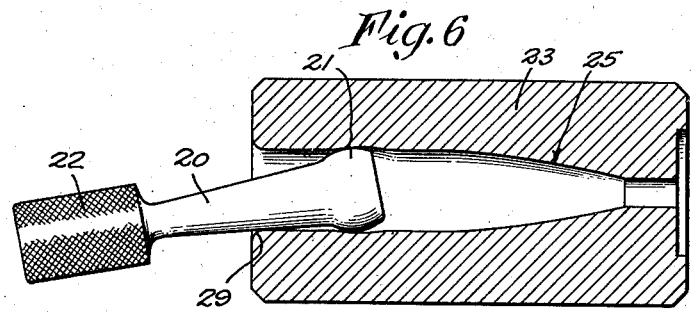
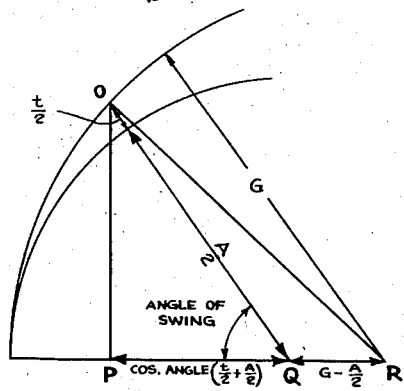
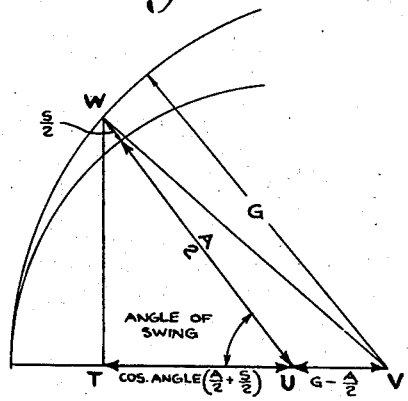
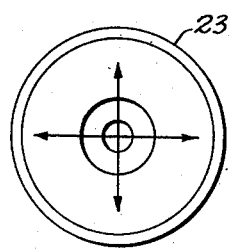
INVENTOR.
GEORGE R. ECKSTEIN
BY
ATTORNEYS Patented June 5, 1945

2,377,679

UNITED STATES PATENT OFFICE 2,377,679

GAUGE

George R. Eckstein, Bridgeport, Conn., assignor to Remington Arms Company, Inc., Bridgeport, Conn., a corporation of Delaware Application September 14, 1943, Serial No. 502,241

2 Claims. (Cl. 33—178)

The present invention relates to a gauge and is particularly adapted for the gauging of apertures or bores having allowable limits in dimensions such as, for example, a die for assembling and shaping bullets.

It frequently is necessary to gauge apertures to determine if the dimensions thereof fall within certain limits. When these apertures are extended in length, it is also desirable to be able to determine if there are any undercut portions and to determine if the dimensions are within the tolerances throughout the length of the bore. If the walls are tapered it is also desirable to gauge the diameter for the full length of the bore.

The invention is described herein in conjunction with its use in determining the contour of a bullet assembly die such as used in the manufacture of small arms ammunition, but it is to be distinctly understood that it is not limited thereto. These and other objects of the invention will appear from the following description.

Fig. 1 is a side view of one form of gauge which may be used.

Fig. 2 shows the use of such a gauge for determining the minimum bore as the gauge approach the basic bore.

Fig. 3 is similar to Fig. 2 and shows a bore which is too large.

Fig. 4 shows the ideal path of gauging if the bore has the desired contour.

Fig. 5 shows the gauging of the bore near the opening thereof at which point the bore is too large.

Fig. 6 shows the effect of an undercut in the bore.

Fig. 7 shows graphically the geometrical derivation used in determining the radius of the ellipsoidal portions of the button or knob of the gauge.

Fig. 8 shows graphically the geometrical derivation used to determine the angle through which the gauge must swing at the heel position.

Fig. 9 is a diagrammatic view showing the directions in which the handle may be moved so as to check the roundness of the bore.

In the design and production of bullet dies, it is essential that the contour and size thereof fall within certain predetermined tolerances and these tolerances are extremely small. It is also desirable that bullet assembly dies have a slight taper so as to allow withdrawal of the bullet or jackets from the die. The quick and accurate determination of the size of the die is particularly necessary in the quantity production of small arms ammunition.

The present gauge will also indicate whether or not there are any undercuts in the profile of the die. If there are undercuts, it is obvious that it will be difficult to withdraw the bullet from the die.

The gauge is comparatively simple, easy to make, and has a rather large wearing surface. The gauge comprises an ellipsoidal portion or button with a shank extending therefrom, the shank having a predetermined shape relative to the button and the hole to be gauged. As employed herein, the term "ellipsoidal" means a surface of revolution which falls between a sphere having a radius of the minimum diameter of the basic bore, and a cylinder having the minimum radius of the basic bore. The basic bore is considered the diameter at the innermost point of the hole which is to be gauged. The shank may be tapered, such as is shown in Fig. 2 at 20, and attached to the ellipsoidal portion 21. Shank 20 may also have a handle 22. The method of use of the gauge will be described and then the manner in which the dimensions thereof can be calculated.

In Fig. 2, 23 is a cross-sectional view of a conventional bullet assembly die. The basic bore is at 24 at some predetermined distance M from the end of the die. The exact location of the basic bore may or may not be critical. To the right of the basic bore, the bullet die can have a conventional ogive shape 25. The heel 26 of the bullet is located at a distance N from the end 27 of the die. The distance across the ellipsoidal button 21 at right angles to the axis of the die is made the minimum diameter of the bore at this point. The ellipsoidal portion is designed in conjunction with the tapered shank so that if the bore at 24 is the maximum or more, the shank 20 will touch the side of the die at 28 as shown in Fig. 3. If the shank does not touch and enters to the desired depth, the bore is within the tolerances for which the gauge is designed. The taper of the shank is selected and related to the ellipsoidal button so that when the bore at the heel is to be gauged the shank will not touch the side of the die if the bore at the heel is within the selected tolerances.

Referring to Fig. 5, the shank is shown touching the side of the die at 29 indicating that the bore at the heel is too large. The ideal path of gauging is shown in Fig. 4 wherein the side of the shank does not touch the side of the die as the gauge is withdrawn from the bore. If there is an undercut in the bore at any point, the gauge will strike the side of the die near the mouth as shown in Fig. 6 or the handle will change from a smooth line of travel as it is pulled out of the bore. The gauge might even jam at the undercut. Any of these will give notice to the gauge operator that there is an undercut.

The roundness of the bore can be determined by moving the handle back and forth in two directions or as many directions as desired, as shown by the arrows in Fig. 9.

The gauge may be designed as described hereafter but it is to be understood that the gauge is not limited to such a shape. Referring to Fig. 1, A is the minimum allowable basic bore, B is the depth of the bore, C is the mouth radius 29 of the die, D is an arbitrary diameter which may be selected. As an example thereof, D can be made .125 inch for caliber .30 bullet assembly dies and .321 inch for caliber .50 bullet assembly dies.

The tangent of the angle of swing at the basic measurement position can be found from the equation $$\frac{A-D}{2B-2C}$$

The cosine of this angle can be determined from suitable trigonometric tables. As the gauge is swung down at the basic bore, if the bore is more than a minimum, there will be a slight change in the gauging point, which is immaterial. The radius G of the ellipsoidal button can be determined. Reference being made to Fig. 7, G is the quantity to be solved for and the side OP is the common side of triangles ORP and OQP, OR being the quantity G. The side OQ is composed of $$\frac{A}{2}$$

and half the tolerance. The side PQ is the cosine of the angle of swing times the hypotenuse, $$\left(\frac{t}{2}+\frac{A}{2}\right)$$

Then G may be solved for as follows:

$$G^2 - \left[\left(G-\frac{A}{2}\right) + \cos\text{ angle}\left(\frac{t}{2}+\frac{A}{2}\right)\right]^2 = \left(\frac{t}{2}+\frac{A}{2}\right)^2 - \left[\cos\text{ angle}\left(\frac{t}{2}+\frac{A}{2}\right)\right]^2$$

$$G^2 - \left[G^2 - GA + \frac{A^2}{4} + 2G\cos\text{ angle}\left(\frac{t}{2}+\frac{A}{2}\right) - A\cos\text{ angle}\left(\frac{t}{2}+\frac{A}{2}\right) + \cos^2\text{ angle}\left(\frac{t}{2}+\frac{A}{2}\right)\right] = \left(\frac{t}{2}+\frac{A}{2}\right)^2 - \cos^2\text{ angle}\left(\frac{t}{2}+\frac{A}{2}\right)^2$$

$$GA - \frac{A^2}{4} - 2G\cos\text{ angle}\left(\frac{t}{2}+\frac{A}{2}\right) + A\cos\text{ angle}\left(\frac{t}{2}+\frac{A}{2}\right) = \left(\frac{t}{2}+\frac{A}{2}\right)^2$$

$$G[A - \cos\text{ angle }(t+A)] = \frac{t^2}{4} + \frac{tA}{2} + \frac{A^2}{2} - \frac{A}{2}\cos\text{ angle }(t+A)$$

$$G[A - \cos\text{ angle }(t+A)] = \left(\frac{t}{2}\right)^2 + \frac{tA}{2} + \frac{A}{2}[A - \cos\text{ angle }(t+A)]$$

$$G = \frac{\left(\frac{t}{2}\right)^2 + \frac{tA}{2}}{[A - (\cos\text{ angle})(t+A)]} + \frac{A}{2}$$

Then let F be the distance from the mouth of the die to the bullet heel and S the tolerance of the die bore at the heel. Referring to Fig. 8, the angle of swing of the gauge at the bore can be determined by solving the two triangles having a common side WT as follows:

$$G^2 - \left[\cos\text{ angle}\left(\frac{A}{2}+\frac{S}{2}\right) + \left(G-\frac{A}{2}\right)\right]^2 = \left[\frac{A}{2}+\frac{S}{2}\right]^2 - \left[\cos\text{ angle}\left(\frac{A}{2}+\frac{S}{2}\right)\right]^2$$

$$G^2 - \left[\cos\text{ angle}\left(\frac{A}{2}+\frac{S}{2}\right)\right]^2 - 2\cos\text{ angle}\left(\frac{A}{2}+\frac{S}{2}\right)\left(G-\frac{A}{2}\right) - \left(G-\frac{A}{2}\right)^2 = \left(\frac{A}{2}+\frac{S}{2}\right)^2 - \cos^2\text{ angle}\left(\frac{A}{2}+\frac{S}{2}\right)$$

$$-2\cos\text{ angle}\left(\frac{A}{2}+\frac{S}{2}\right)\left(G-\frac{A}{2}\right) + GA - \frac{A^2}{4} = \frac{AS}{2} + \frac{S^2}{4} + \frac{A^2}{4}$$

$$\cos\text{ angle} = \frac{-\frac{A^2}{2} + AG - \frac{AS}{2} - \frac{S^2}{4}}{(A+S)\left(G-\frac{A}{2}\right)}$$

$$\cos\text{ angle} = \frac{A\left(G-\frac{A}{2}\right) - \frac{1}{2}\left(AS+\frac{S^2}{2}\right)}{(A+S)\left(G-\frac{A}{2}\right)}$$

$$\cos\text{ angle} = \frac{A}{A+S} - \frac{1}{2}\left[\frac{AS+\frac{S^2}{2}}{(A+S)\left(G-\frac{A}{2}\right)}\right]$$

The tangent of the angle of swing at the heel can be determined from trigonometric tables and from this the diameter E may be calculated in accordance with the formula $E = A - (\tan\text{ angle})\,2F$. The distance H depends on the bore being gauged and can be arbitrarily selected as $\frac{3}{32}''$ for caliber .30 dies and $\frac{5}{32}''$ for caliber .50 dies.

The shape of the shank may be made other than a straight taper if it is desired to gauge a hole not having a straight taper. It is also apparent that the handle need not take the shape illustrated. A mark or series of marks can be placed on the shank which may be aligned with the end of the die to indicate the depth of the gauge.

The gauge of the present invention is simple to construct, to use, and is adapted to gauge for a number of dimensions or characteristics.

What is claimed is:

1. A tolerance gauge for elongated circular apertures comprising an ellipsoidal button on one end and a shank extending therefrom, said shank having a predetermined profile relative to said ellipsoidal button, the joinder of said shank with said button being of a reduced dimension and spaced from the point of minimum diameter of said button a distance such that the shank at said reduced point will not touch the walls of an aperture of less than maximum size when the button is gauging a portion adjacent the aperture mouth, and the transverse dimension of the extended portion of the shank being such that it will not touch the walls of said aperture when the deepest part of the aperture is less than maximum size.

2. A tolerance gauge for elongated circular apertures comprising an ellipsoidal button on one end and a shank extending therefrom, said shank having a predetermined profile relative to said ellipsoidal button, the joinder of said shank with said button being of a reduced dimension and spaced from the point of minimum diameter of said button a distance such that the shank at said reduced point will not touch the walls of an aperture of less than maximum size when the button is gauging a portion adjacent the aperture mouth, and the transverse dimension of the extended portion of the shank being such that it will not touch the walls of said aperture when the deepest part of the aperture is less than maximum size, said shank being shaped so as not to touch the walls of said aperture when intermediate points are being gauged which are less than the maximum size.

GEORGE R. ECKSTEIN.